United States Patent [19]

Higasa et al.

[11] Patent Number: 5,646,811

[45] Date of Patent: Jul. 8, 1997

[54] REVERSE-CHARGE PREVENTION APPARATUS

[75] Inventors: Hiromasa Higasa; Fumihiko Ishikawa, both of Takamatsu, Japan

[73] Assignee: Kabushiki Kaisha Shikoku Sogo Kenkyujo, Kagawa, Japan

[21] Appl. No.: 211,546

[22] PCT Filed: Aug. 7, 1992

[86] PCT No.: PCT/JP92/01012

§ 371 Date: Aug. 3, 1994

§ 102(e) Date: Aug. 3, 1994

[87] PCT Pub. No.: WO94/03957

PCT Pub. Date: Feb. 17, 1994

[51] Int. Cl.[6] .................................................. H02H 3/00
[52] U.S. Cl. .................................................. 361/63; 361/82
[58] Field of Search ....................... 361/62–64, 82, 361/84, 85; 307/72, 84–87, 126, 127, 129; 323/906

[56] References Cited

FOREIGN PATENT DOCUMENTS

| | | | |
|---|---|---|---|
| 63-287328 | 11/1988 | Japan | H02J 3/38 |
| 64-12824 | 1/1989 | Japan | H02J 3/38 |
| 3-256534 | 11/1991 | Japan | H02J 3/38 |
| 3-256533 | 11/1991 | Japan | H02J 3/38 |

*Primary Examiner*—Jeffrey A. Gaffin
*Assistant Examiner*—Ronald W. Leja
*Attorney, Agent, or Firm*—Keck, Mahin & Cate

[57] ABSTRACT

In a reverse-charge prevention apparatus (24) including a 1st breaker (25) for connecting or disconnecting an electric power system (A) to or from a distributed electric power apparatus (11), in which the 1st breaker (25) is switched off when the distributed electric power apparatus (11) is disconnected from the electric power system (A) by switching off a 2nd breaker (F) disposed in the electric power system (A) so that reverse-charge from the distributed electric power apparatus (11) to the electric power system (A) is prevented, the reverse-charge prevention apparatus (24) further includes a disturbance generator (20) for slightly varying electric power outputted by the distributed electric power apparatus (11) regularly with a given period; a variable period extraction circuit and a filter (26, 27) for extracting a variable period same in period to the given period, the variable period existing in a period of an alternating-current voltage outputted by the distributed electric power apparatus (11); and a judgment circuit (28) for switching off the 1st breaker (25) when the extraction circuit and the filter (26, 27) regularly extract the variable period.

5 Claims, 7 Drawing Sheets

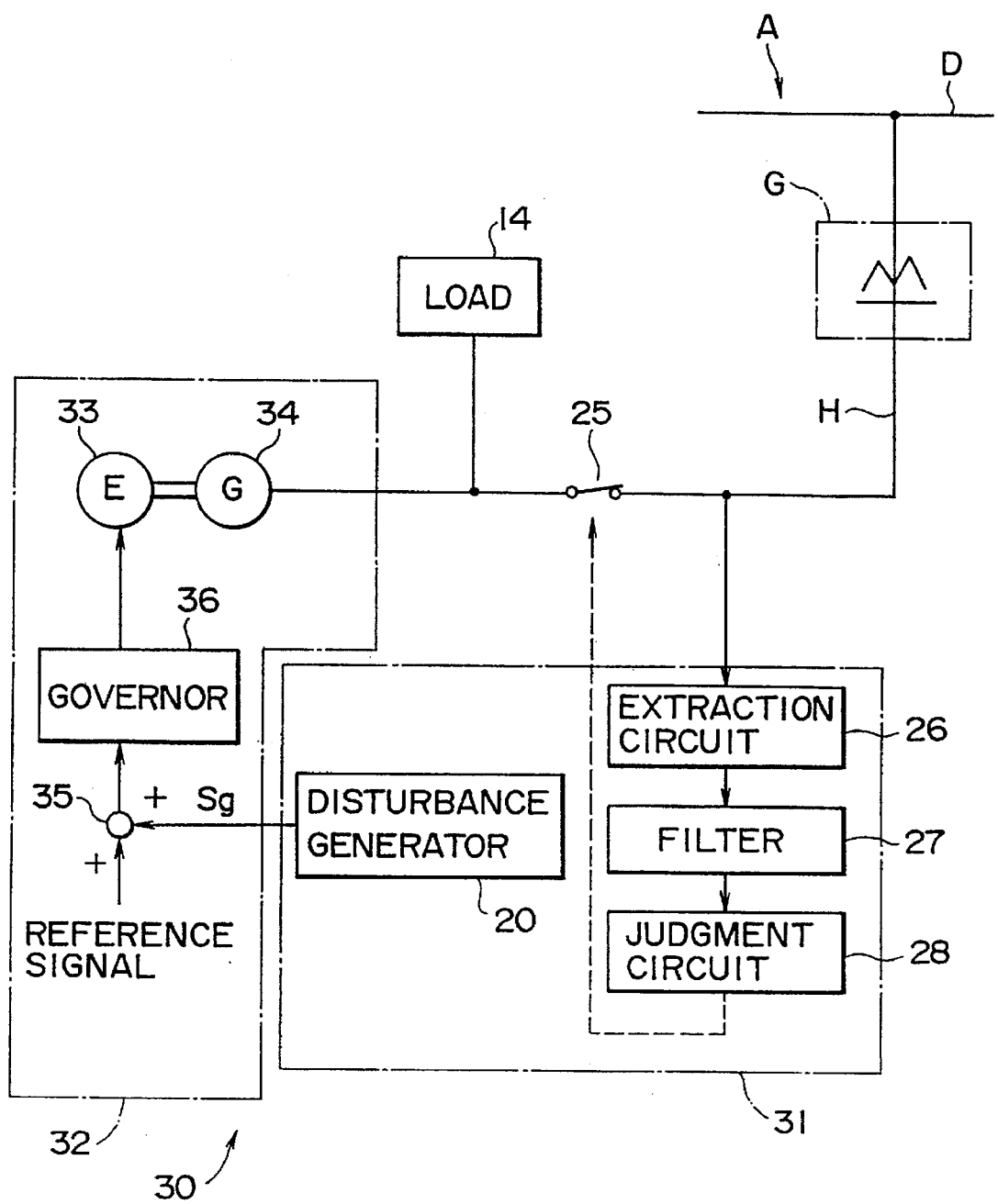
F I G. 5

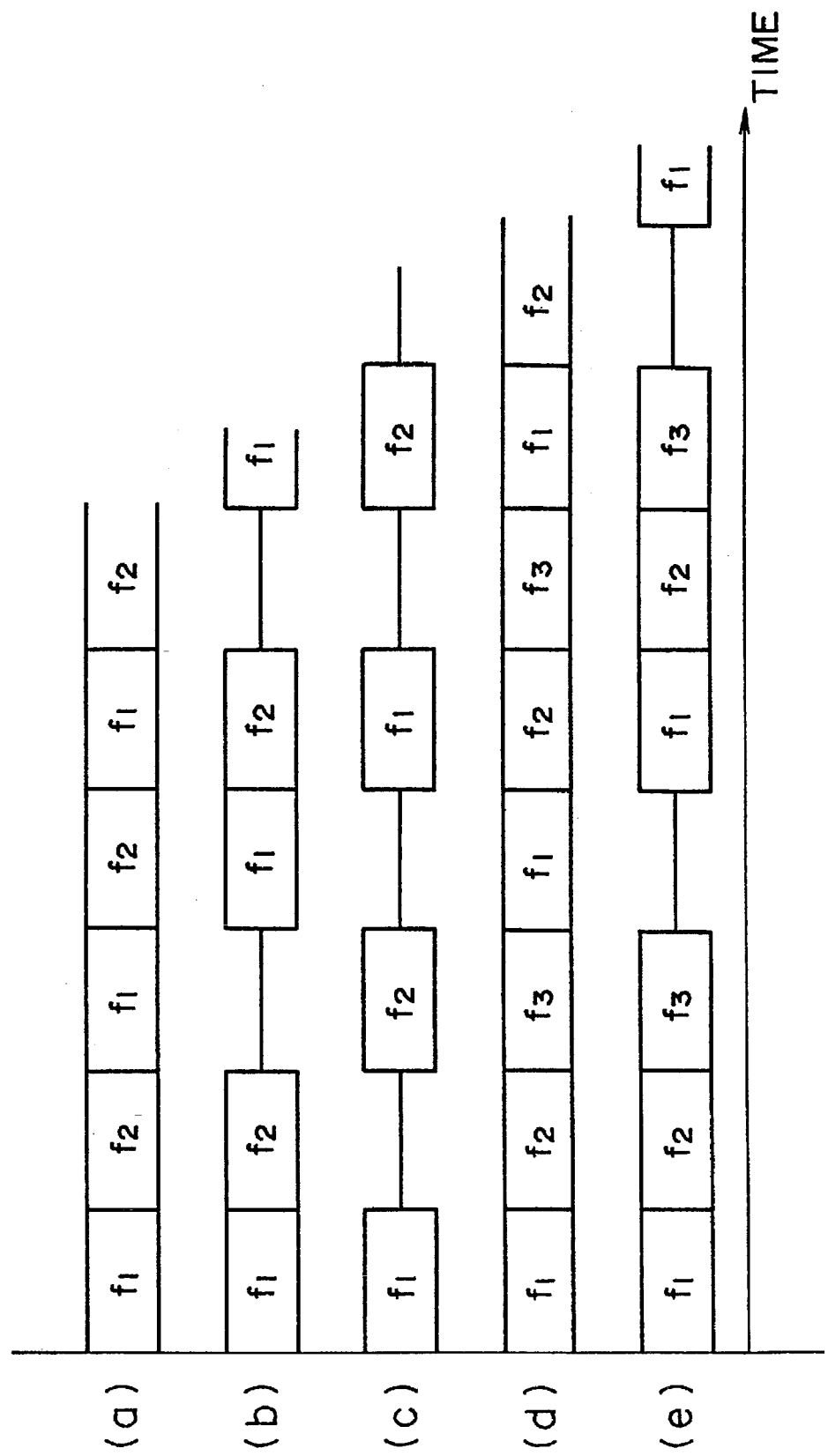

REVERSE-CHARGE PREVENTION APPARATUS

BACKGROUND OF THE INVENTION

1. Field of the Invention

This invention relates to a reverse-charge prevention apparatus including a 1st breaker for connecting or disconnecting an electric power system to or from a distributed electric power apparatus, in which reverse-charge from the distributed electric power apparatus to the electric power system is prevented by switching off the 1st breaker when the distributed electric power apparatus is disconnected from the electric power system by switching off a 2nd breaker disposed in the electric power system.

2. Description of the Prior Art

In recent years, in order to harness natural energy or improve the efficiency of energy use, there has been developed an inverter type of distributed electric power apparatus in which direct-current electric power output by a solar battery or a fuel battery is transformed into alternating-current electric power by means of an inverter or a so-called "cogeneration" type of distributed electric power apparatus in which alternating-current electric power is generated by linking an engine to a generator. By connecting such a distributed electric power apparatus to the electric power system (constituted of power stations, transmission lines, substations, distribution lines, etc.), an electricity shortage can be filled up by the electric power of the electric power system to constantly supply electric power when an accident occurs to the distributed electric power apparatus or electric power generated by only the distributed electric power apparatus cannot sufficiently meet electric power demand.

However, the following problem might occur in a case in which the distributed power apparatus and the electric power system are connected to each other.

That is, there is a case in which, before construction work or repairs are carried out for the electric power system, breakers are switched off to stop supplying electric power. If the distributed electric power apparatus is connected to a distribution line, a voltage of the distributed electric power apparatus is applied to the distribution line so that a state of reverse-charge is made even if the electric power system is intercepted (in other words, even if a breaker of the distribution line is switched off to stop supplying electricity). For this reason, a worker carrying out the construction work or the like on the distribution line has a lot of danger of receiving an electric shock due to the reverse-charge.

Accordingly, a method is conventionally adopted in which the distributed electric power apparatus is provided with an over-under voltage relay (about ±10% with respect to a reference voltage), an abnormal frequency relay (about ±1 Hz) with respect to a reference frequency), or the like and is disconnected from the electric power system on the assumption that the circuit of the electric power system is opened (broken) if an allowable value is exceeded by a difference between the reference voltage and a voltage generated when the circuit of the electric power system is opened or a difference between the reference frequency and a frequency generated when the same is opened.

However, in the above method, if the electric power from the distributed electric power apparatus and a load needed by consumers are balanced with each other, there occurs a problem that the openness of the circuit of the electric power system cannot be certainly detected since variations in voltage and frequency are too small to be detected by the above relays.

To solve the problem, in view of the fact that the inverter type of distributed electric power apparatus has a variation different from a periodic variation peculiar to the electric power system in a period of an outputted alternating-current voltage, a reverse-charge prevention apparatus is proposed in which, by judging that a supply of power is cut off from the electric power system when a variation in the period of the alternating-current voltage is observed on the side of the distributed electric power apparatus, the distributed electric power apparatus is disconnected from the electric power system so that the reverse-charge from the distributed electric power apparatus to the electric power system is prevented.

However, there is a case in which the inverter type of distributed electric power apparatus has no variation different from the periodic variation peculiar to the electric power system if use is made of not only a still type of generator, such as a solar generator, but also a rotary generator provided with a diesel engine for cogeneration in the distributed electric power apparatus.

In this case, as a further problem, it is difficult to judge whether the electric power system is opened or not, hence that the reverse-charge cannot be prevented.

To solve the problem, another reverse-charge prevention apparatus is proposed in which a slight periodic variation different from a periodic variation peculiar to the electric power system is first given to the alternating electric power outputted by the distributed electric power apparatus so that a variable period same in period to the slight periodic variation given thereto appears in a period of the alternating voltage outputted by the distributed electric power apparatus when the electric power system is opened and then the distributed electric power apparatus is disconnected from the electric power system when the variable period of the alternating voltage is extracted.

However, since a variable period peculiar to the electric power system depends on each area where electric power is used and further variable periods of the cogeneration types of distributed electric power apparatuses are different from each other, it is impossible to equally determine respective variable periods given to the alternating-current electric power of the distributed electric power apparatuses and, in a certain area, it is difficult to judge whether the electric power system is opened or not.

This invention was made in view of the above problems and aims to provide a reverse-charge prevention apparatus in which the openness of the electric power system is certainly detected independently of a variable period peculiar to the electric power system or a variable period of the distributed electric power apparatus, so that the reverse-charge from the distributed electric power apparatus to the electric power system is prevented.

SUMMARY OF THE INVENTION

In order to attain the object, a reverse-charge prevention apparatus according to the invention is constructed as follows. That is, in the reverse-charge prevention apparatus including a 1st breaker for connecting or disconnecting an electric power system to or from a distributed electric power apparatus, which the 1st breaker is switched off when the distributed electric power apparatus is disconnected from the electric power system by switching off a 2nd breaker disposed in the electric power system so that the reverse-charge from the distributed electric power apparatus to the electric power system is prevented, the reverse-charge prevention apparatus further includes a means for slightly varying electric power outputted by the distributed electric power apparatus regularly with a given period so that a slight variation same in period to the given period is given to a period of an alternating-current voltage outputted by the distributed electric power apparatus, a means for extracting a variable period same in period to the given period, the variable period existing in a period of an alternating-current voltage outputted by the distributed electric power apparatus, and a judging means for switching off the 1st breaker when the variable period extracting means regularly extracts the variable period.

According to the invention, the slightly varying means slightly varies the electric power outputted by the distributed electric power apparatus regularly with a given period, the variable period extracting means extracts a variable period same in period to the given period which exists in a period of an alternating current voltage outputted by the distributed electric power apparatus, and the judging means switches off the 1st breaker when the variable period extracting means regularly extracts the variable period.

DESCRIPTION OF THE DRAWINGS

FIG. 5 is a block diagram showing a construction of a cogeneration type of distributed electric power system.

FIG. 8 is an explanation view showing an example of variations.

DETAILED DESCRIPTION OF THE PREFERRED EMBODIMENT

The embodiment of the invention will be hereinafter described with reference to the attached drawings.

Figure 1:
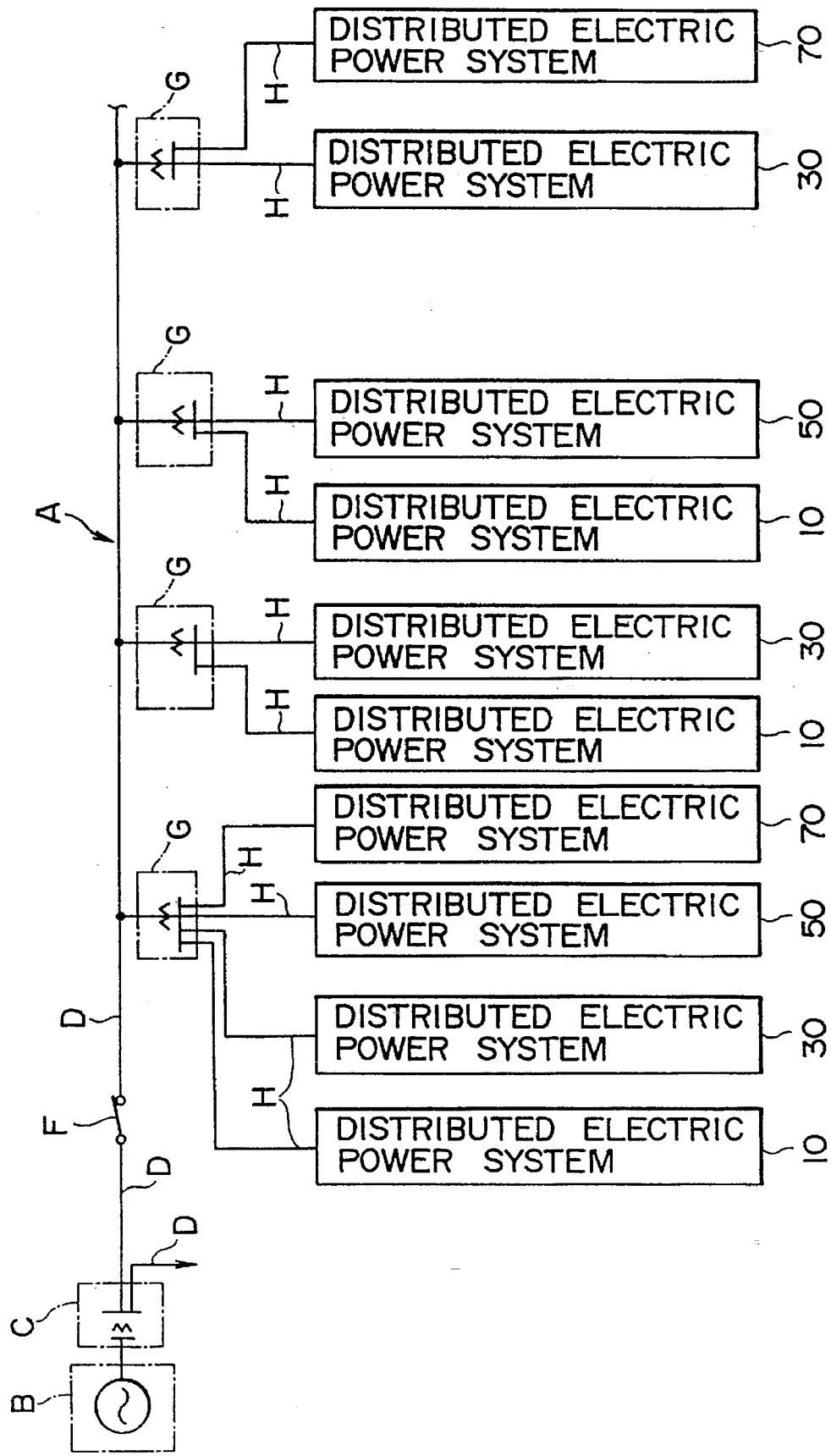
FIG. 1 is an explanation view showing a connection between distributed electric power systems and an electric power system according to the invention.

In FIG. 1, reference character A designates an electric power system which includes a generating station B, a distribution substation C, a distribution line D, a breaker (2nd breaker) F disposed in the distribution line D, a transformer G on an electric pole, and an incoming line H. Electric power generated by the generating station B is stepped down to 6 KV by the distribution substation C and is transmitted through demanded numbers of distribution lines D. Thus distributed electric power for each distribution line D is supplied to the transformer G, which is located at various places, through the breaker F. The electric power supplied to the transformer G is stepped down to 100 V or 200 V to be supplied to each consumer through the incoming line H. Each consumer owns distributed electric power systems 10, 30, 50, and 70.

Figure 2:
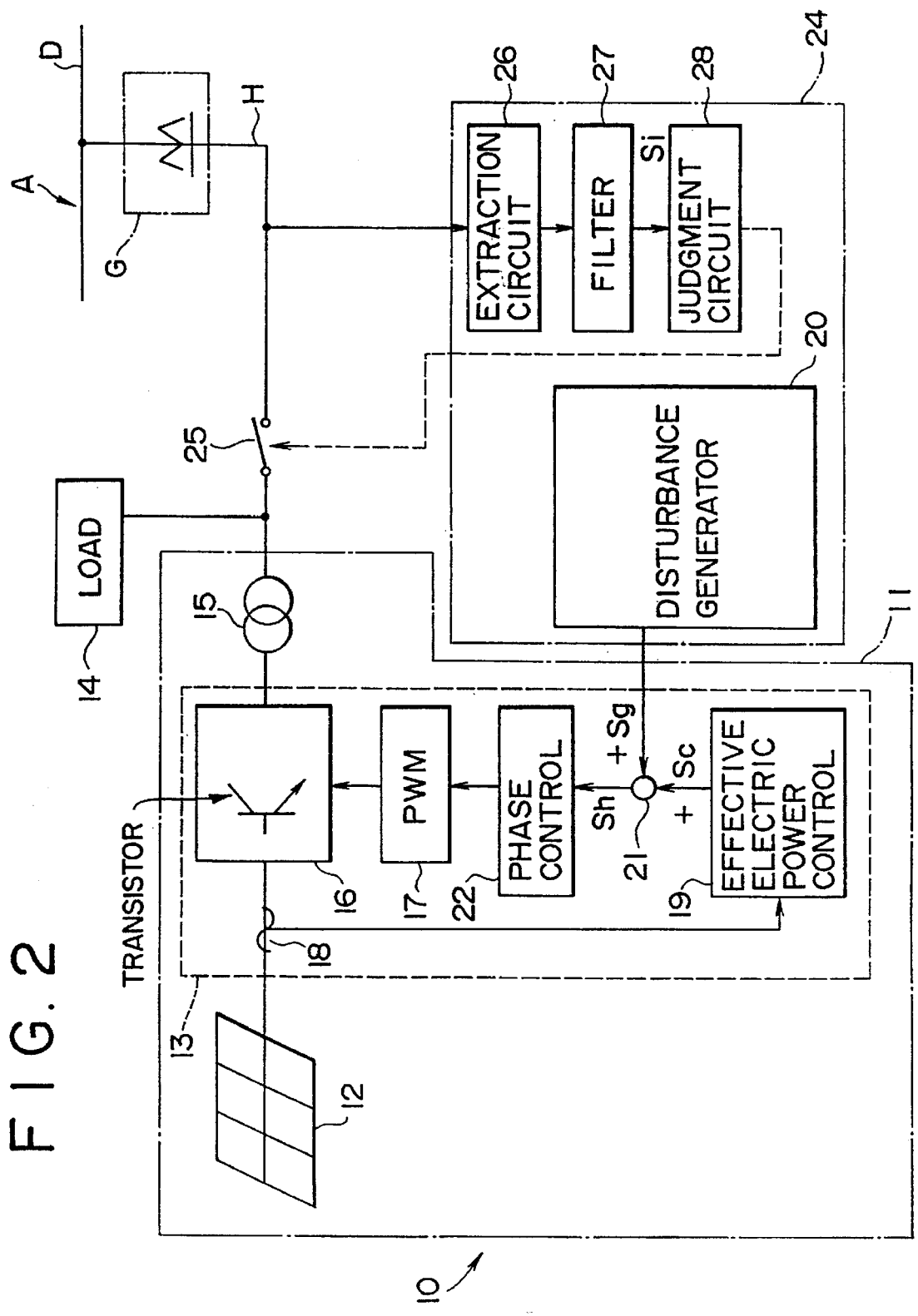
FIG. 2 is a block diagram showing a construction of a distributed electric power system according to the invention.

As shown in FIG. 2, the distributed electric power system 10 comprises a distributed electric power apparatus 11, a reverse-charge prevention apparatus 24, a breaker 25 (1st breaker) for disconnecting the distributed electric power apparatus 11 from the electric power system A.

The distributed electric power apparatus 11 comprises a solar battery 12, an inverter 13 which transforms direct-current electric power outputted by the solar battery 12 into alternating-current electric power, and a transformer 15 which transforms a voltage of the alternating-current electric power transformed by the inverter 13 into a given voltage to supply to a load 14 and insulates the solar battery 12 and a ground system from the electric power system A.

The inverter 13 comprises a transistor 16 serving as a switch, a switching operation transistor 16, a pulse width modulator 17 which outputs a pulse according to a period of a commercial frequency and causes the transistor 16 to operate only during the output of the pulse, an electric power detector 18 which detects a direct-current electric power outputted by the solar battery 12, an effective electric power control circuit 19 which determines effective electric power outputted by the transistor 16 on the basis of the electric power detected by the electric power detector 18, an adder 21 which adds an output signal of the effective electric power control circuit 19 to an output signal of a disturbance generator 20 which will be hereinafter described, and a phase control circuit 22 which determines a width of the pulse from a value obtained by the adder 21.

Figure 3:
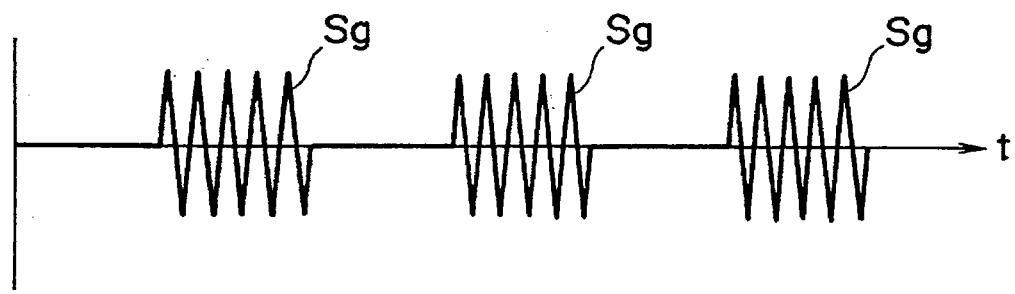
FIG. 3 is an explanation view showing a variable waveform.

The reverse-charge prevention apparatus 24 comprises the disturbance generator (slight variation giving means) 20 which outputs variation signal Sg for giving a slight variation of a frequency fi of a given period to the alternating-current electric power outputted by the inverter 13 at regular intervals of a fixed period T as shown in FIG. 3, a variable period extraction circuit 26 which extracts a variable period of a period of an alternating-current voltage outputted by the transformer 15, a filter 27 which passes a signal Si having a given period (frequency fi) of extracted variable periods through, and a judgment circuit (a judgment means) 28 which switches off the breaker 25 when the signals Si are outputted from the filter 27 at regular intervals of the fixed period T. The variable period extraction circuit 26 and the filter 27 constitute a variable period extraction means for extracting a variable period same in period to the given period existing in a period of the alternating-current voltage.

The action of the above embodiment will now be described. A description thereof will be given on the supposition that each consumer has only the distributed electric power system 10.

When direct-current electric power is outputted by the solar battery 12, the electric power detector 18 detects the direct-current electric power, the effective electric power control circuit 19 determines effective electric power outputted by the transistor 16 on the basis of the electric power detected by the electric power detector 18 and outputs a control signal Sc according to the effective electric power.

On the other hand, as shown in FIG. 3, the disturbance generator 20 outputs a disturbance signal Sg of frequency fi of a given period at regular intervals of a fixed period T. The adder 21 adds a control signal Sc of the effective electric power control circuit 19 to a disturbance signal Sg of the disturbance generator 20. A resultant signal Sh obtained by the adder 21 is varied with a fixed period (frequency fi)) L since the disturbance signal Sg is included therein. The phase control circuit 22 controls a pulse width W of a pulse signal P outputted by the pulse width modulator 17 according to the signal Sh of the adder 21.

Figure 4:
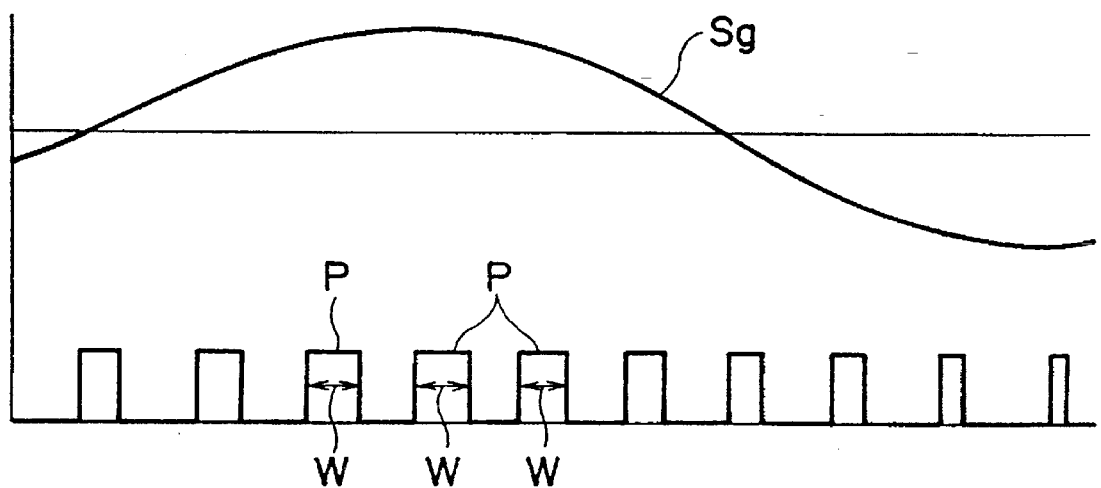
FIG. 4 is an explanation view showing a relationship between a variable waveform and a pulse width.

The pulse signal P is outputted with the same period as the commercial frequency. As shown in FIG. 4, in the pulse signal P, the pulse width W is altered according to a variation of the fixed period L. The transistor 16 is actuated by the pulse signal P and outputs alternating-current electric power. Due to a variation of the pulse width W of the pulse signal P, the alternating-current electric power outputted by the transistor 16 slightly varies with the fixed period L and varies at regular intervals of the fixed period T slightly and repeatedly.

That is, the electric power outputted by the inverter 13 slightly varies with the fixed period L and this slight variation is repeated at regular intervals of the fixed period T. This alternating-current electric power is transformed into, for example, 100 V by the transformer 15 to be supplied to the load 14.

If the breaker F of the electric power system A remains switched off and the distributed electric power apparatus 11 is connected with the electric power system A, a slight variation of electric power outputted by the inverter 13 is absorbed since the electric power system A is extremely large in scale as if it is considered infinite. As a result, a variable period of the fixed period L does not appear in a period of an alternating-current voltage applied to the distribution line H. Therefore, the variable period extraction circuit 26 does not extract the variable period of the fixed period existing in the period of the alternating-current voltage of the distribution line H.

By the way, there is a case in which a variation of the fixed period L is generated in the period of an alternating-current voltage by the electric power system A or other distributed electric power apparatuses.

In this case, the variable period extraction circuit 26 extracts the variable period, so that the filter 27 passes a signal of the extracted period through. However, the variation of the fixed period L is generated continuously or at random. In other words, it is not generated at regular intervals of the fixed period T as shown in FIG. 3. Therefore, the judgment circuit 28 does not judge that the breaker F of the electric power system A has been switched off, hence the breaker 25 is not switched off.

When the distributed electric power 11 brings about a state of reverse-charge by switching off the breaker F of the electric power system A, only other distributed electric power apparatuses 11 are connected to the inverter 13. Therefore, due to a slight variation of electric power outputted by the inverter 13, a period of an alternating-current voltage of the distribution line H varies with the fixed period L. This variation has a frequency fi and appears repeatedly at regular intervals of the fixed period T as shown in FIG. 3.

The variable period extraction circuit 26 extracts the variable period. Of the extracted variable period, a signal Si of a variable period the same in period as the fixed period L passes the filter 27 through and is inputted to the judgment circuit 28. Since the signal Si passes the filter 27 through and is inputted to the judgment circuit 28 repeatedly at regular intervals of the fixed period T, the judgment circuit 28 judges that the breaker F of the electric power system A has been switched off and switches off the breaker 25. The switching-off of the breaker 25 disconnects the distributed electric power apparatus 11 from the electric power system A, thus preventing the reverse-charge caused by the distributed electric power apparatus 11.

As mentioned above, when the signal Si is inputted to the judgment circuit 28 repeatedly at regular intervals of the fixed period T, the judgment circuit 28 judges that the breaker F of the electric power system A has been switched off. A variable period peculiar to the electric power system A or each variable period of other distributed electric power apparatuses appears continuously or at random although each variable period is the same as the fixed period L. For this reason, discrimination can be carried out between a variable period generated by switching off the breaker F and a variable period of the electric power system A or each variable period of the other distributed electric power apparatuses. Thereby, it is certainly detected that the breaker F of the electric power system A has been switched off.

Therefore, independently of a variable period peculiar to the electric power system A of each region and further independently of variable periods generated by other distributed electric power apparatuses, certain detection is carried out of the switching-off of the breaker F of the electric power system A, thereby preventing the reverse-charge caused by the the distributed electric power apparatus 11. Even in a case in which the other distributed electric power apparatuses are each a cogeneration type and the variable periods generated by the distributed electric power apparatuses are different from each other, similar detection and prevention are carried out.

FIG. 5 shows a cogeneration type of distributed electric power system 30 comprising a reverse-charge prevention apparatus 31 and a distributed electric power apparatus 32. The distributed electric power apparatus 32 comprises an engine 33, a generator 34 which is rotated by the engine 33 to generate alternating-current electric power, an adder 35 which outputs an addition signal obtained by adding a signal Sg outputted by the disturbance generator 20 to a reference signal corresponding to a fixed number of revolutions of the engine 33, and a governor 36 which makes a number of revolutions of the engine 33 constant according to the addition signal.

Since the disturbance generator 20 outputs a disturbance signal Sg of a fixed period L (frequency fi) every fixed period as shown in FIG. 3, electric power outputted by the distributed electric power apparatus 32 slightly varies with the fixed period L every fixed period. And, as mentioned above, when the breaker F of the electric power system A is switched off, the judgment circuit 28 of the reverse-charge prevention apparatus 31 detects the switching-off of the breaker F, thereby switching off the the breaker 25 and prevents the reverse-charge caused by the distributed electric power apparatus 32.

Figure 6:
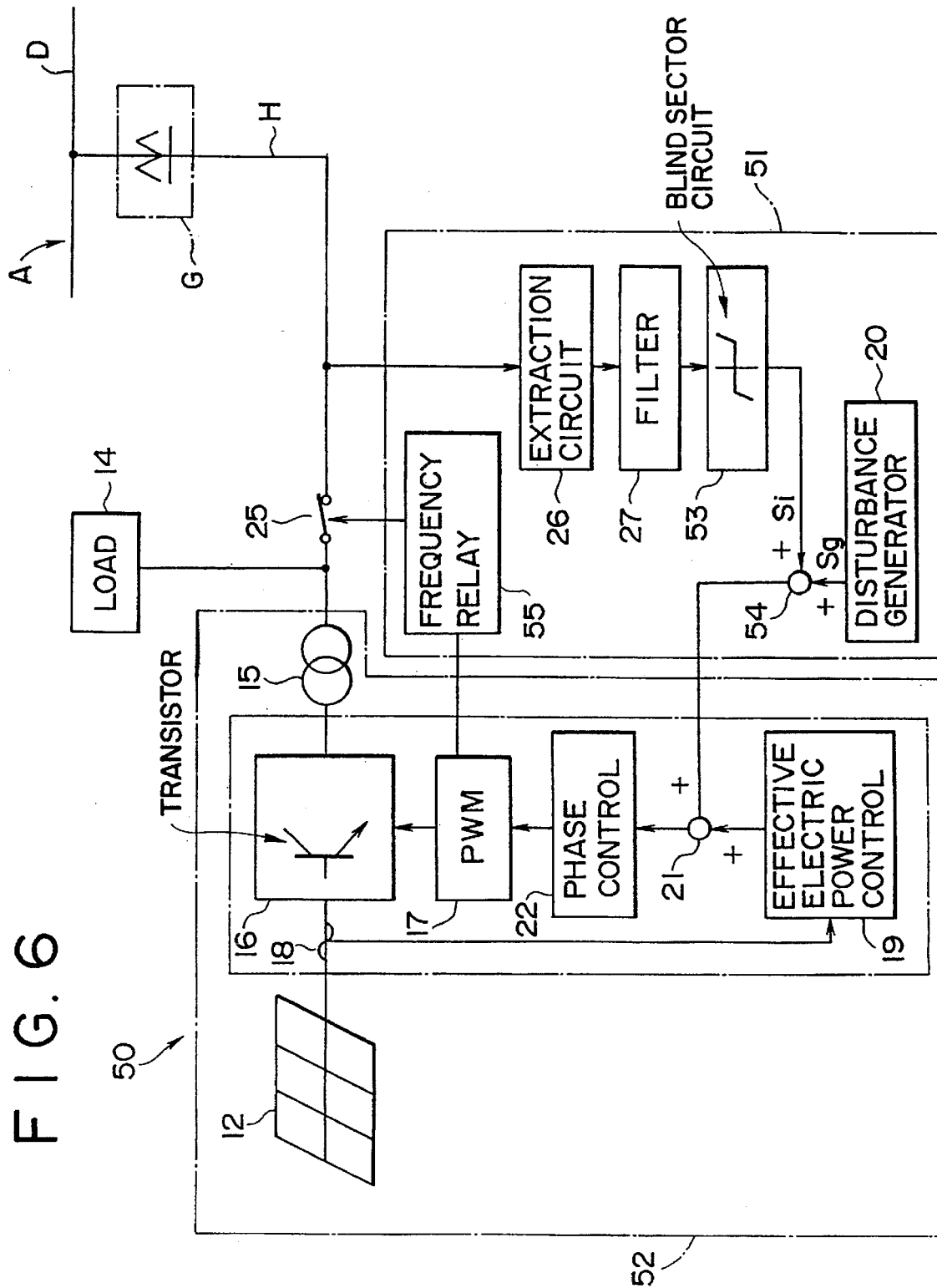
FIG. 6 is a block diagram showing a construction of an inverter type of distributed electric power system.

In a distributed electric power system 50 shown in FIG. 6, detection of the reverse-charge is carried out such that the variation of the fixed period L generated by the disturbance generator 20 is amplified by positive feedback and thereby an output of the pulse width modulator 17 is greatly varied.

The distributed electric power system 50 comprises a reverse-charge prevention apparatus 51 and a distributed electric power apparatus 52. Reference numeral 53 designates a blind sector circuit which outputs a signal Si passing through the filter 27 when the signal Si exceeds a given level. 54 designates an adder which adds the signal Si outputted by the blind sector circuit 53 to a signal Sg outputted by the disturbance generator 20. 55 designates a frequency relay which detects a variation of an output of the pulse width modulator 17 varied more than a fixed frequency and switches off the breaker 25.

That is, when the breaker F of the electric power system A is switched off and positive feedback is applied to the variation of the fixed frequency fi generated by the disturbance generator 20 so that the output of the pulse width modulator 17 is greatly varied, the frequency relay 55 detects its great variation and switches off the breaker 25, thereby preventing the reverse-charge.

Figure 7:
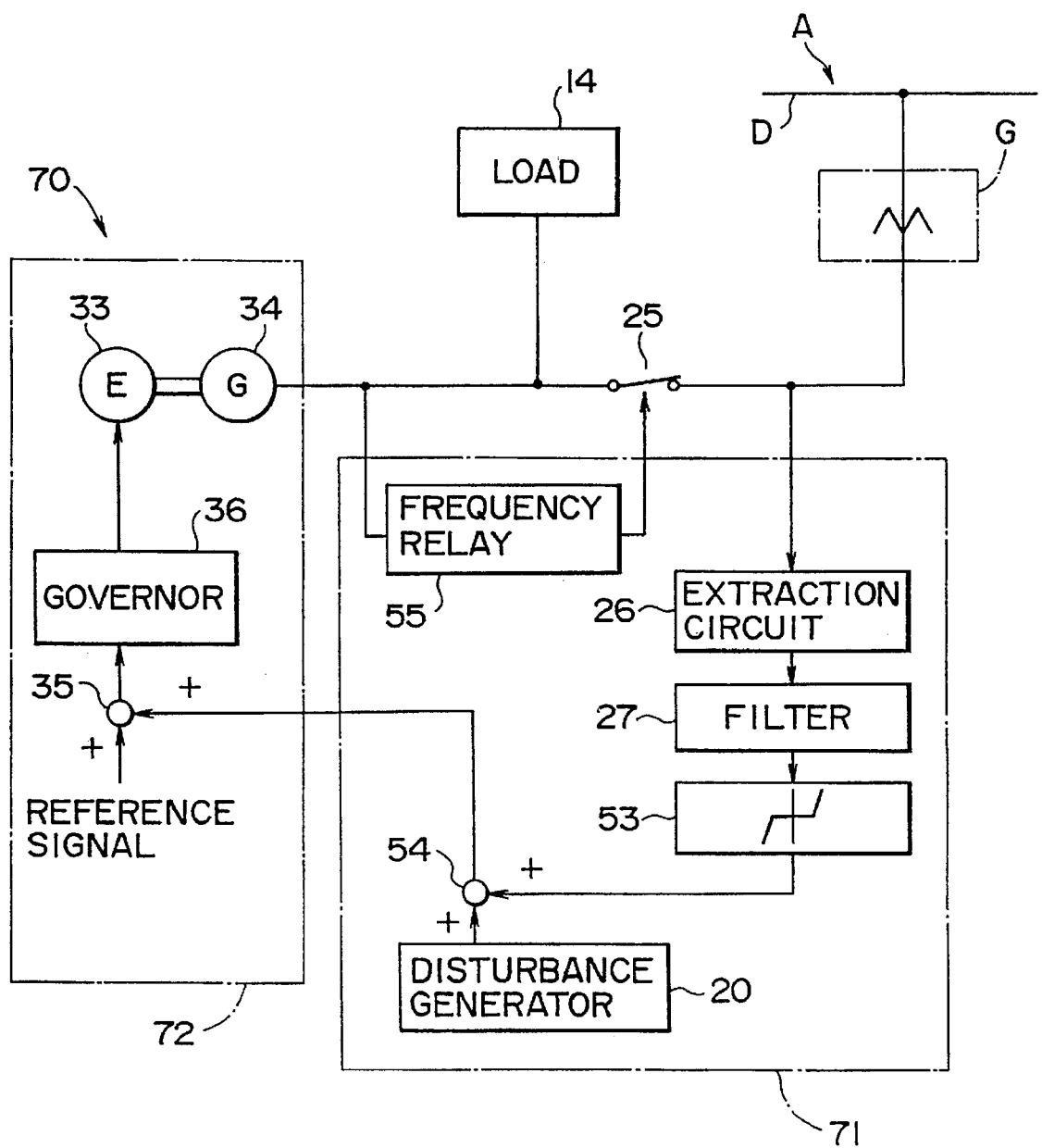
FIG. 7 is a block diagram showing another construction of the cogeneration type of distributed electric power system.

A distributed electric power system 70 shown in FIG. 7 comprises a reverse-charge prevention apparatus 71 and a distributed electric power apparatus 72. In this embodiment, the distributed electric power apparatus 72 has the same constitution as the cogeneration type of distributed electric power apparatus 32 shown in FIG. 5. To the distributed electric power apparatus 72 is applied the reverse-charge prevention apparatus 71 having the same constitution as the reverse-charge prevention apparatus 51 shown in FIG. 6.

If the distributed electric power systems 10, 30, 50, 70 are connected to the electric power system A for use as shown in FIG. 1, the variable signal Sg of the disturbance generator 20 of each of the distributed electric power systems 10, 30, 50, 70 may be outputted synchronously. For this, a synchronous circuit is additionally provided.

FIG. 8 shows other examples of the variable signal Sg outputted by the disturbance generator 20. In (a) of FIG. 8, a 1st period (frequency f1) and a 2nd period (frequency f2) appear alternately. In this case, filter circuits (not shown) for passing signals of the 1st and 2nd period through, respectively, are connected in parallel to the filter 27 of each of the reverse-charge prevention apparatuses 24, 31, 51, 71. When the signals of the 1st and 2nd period are outputted alternately from the filter circuits, the judgment circuit 28 causes the breaker 25 to be switched off.

In (b) and (c) of FIG. 8, the 1st and 2nd periods appear alternately and at regular intervals.

In (d) of FIG. 8, the 1st, 2nd, and 3rd periods (frequencies f1, f2, and f3, respectively) appear by turns.

In (e) of FIG. 8, the 1st, 2nd, and 3rd periods appear by turns and at regular intervals.

Other methods except (a)–(e) may be adopted by variously combining its appearance.

In order to connect the plurality of the distributed electric power systems 10, 30, 50, and 70 to the electric power system A for practical use as shown in FIG. 1, one of the variable signals Sg shown in (a)–(e) of FIG. 8 may be solely used and outputted synchronously.

According to the invention, independently of a variable period peculiar to an electric power system of each region or variable periods generated by other cogeneration types of distributed electric power apparatuses, the switching-off of a breaker of the electric power system is certainly detected, so that the reverse-charge caused by a distributed electric power apparatus is prevented.

Further, even if the other distributed electric power apparatuses are each a cogeneration type and the variable periods generated by them are different from each other, the switching-off of the breaker of the electric power system is certainly detected, so that the reverse-charge caused by the distributed electric power apparatus is prevented.

What is claimed is:

1. A reverse-charge prevention apparatus comprising a first breaker for connecting an electric power system to and disconnecting the electric power system from a distributed electric power apparatus, wherein said first breaker is switched off when said distributed electric power apparatus is disconnected from said electric power system by switching off a second breaker disposed in said electric power system so that reverse-charge from said distributed electric power apparatus to said electric power system is prevented, said reverse-charge prevention apparatus further comprising:

slight variation providing means for providing a slight variation with a given period to electric power outputted by said distributed electric power apparatus at regular intervals;

extracting means for extracting a slight variation having a period which is the same as the given period, the slight variation extracted by said extracting means existing in a period of an alternating-current voltage outputted by said distributed electric power apparatus; and judging means for judging when the slight variation extracted by said extracting means has been extracted at regular intervals and switching off said first breaker when said judging means judges that the slight variation extracted by said extracting means has been extracted at regular intervals.

2. A reverse-charge prevention apparatus comprising a first breaker for connecting an electric power system to and disconnecting the electric power system from a distributed electric power apparatus, wherein said first breaker is switched off when said distributed electric power apparatus is disconnected from said electric power system by switching off a second breaker disposed in said electric power system so that reverse-charge from said distributed electric power apparatus to said electric power system is prevented, said reverse-charge prevention apparatus further comprising:

slight variation providing means for providing a slight variation with a given period to electric power outputted by said distributed electric power apparatus for each predetermined duration;

extracting means for extracting a slight variation having a period which is the same as the given period, the slight variation extracted by said extracting means existing in a period of an alternating-current voltage outputted by said distributed electric power apparatus; and judging means for judging when the slight variation extracted by said extracting means has been extracted for each predetermined duration and switching off said first breaker when said judging means judges that the slight variation extracted by said extracting means has been extracted for each predetermined duration.

3. A reverse-charge prevention apparatus according to claim 2, wherein a period of the slight variation given to the electric power outputted by said distributed electric power apparatus is switched over whenever a fixed time elapses.

4. A reverse-charge prevention apparatus according to claim 2, wherein a period of the slight variation given to the electric power outputted by said distributed electric power apparatus is switched over for each predetermined duration.

5. A reverse-charge prevention apparatus comprising a first breaker for connecting an electric power system to and disconnecting the electric power system from a distributed electric power apparatus, wherein said first breaker is switched off when said distributed electric power apparatus is disconnected from said electric power system by switching off a second breaker disposed in said electric power system so that reverse-charge from said distributed electric power apparatus to said electric power system is prevented, said reverse-charge prevention apparatus further comprising:

slight variation providing means for providing at least two slight variations to electric power outputted by said distributed electric power apparatus, said at least two slight variations being first and second slight variations which respectively have first and second periods, the first and second periods being different in period from each other;

first extracting means for extracting the first slight variation which exists in a period of an alternating-current voltage outputted by said distributed electric power apparatus;

second extracting means for extracting the second slight variation which exists in a period of an alternating-current voltage outputted by said distributed electric power apparatus; and judging means for judging when said first and second extracting means have extracted the first and second slight variations respectively and alternately and switching off said first breaker when said judging means judges that said first and second extracting means have extracted the first and second slight variations respectively and alternately.

* * * * *